United States Patent
Relats Casas

(10) Patent No.: US 6,391,446 B1
(45) Date of Patent: May 21, 2002

(54) TEXTILE ELEMENT MADE OF FIBRES WHICH CONTAIN SILICON AND PROCEDURE FOR IMPROVING THEIR THERMAL STABILITY

(75) Inventor: Pere Relats Casas, Caldes de Montbui (ES)

(73) Assignee: RELATS, S.A., Caldes de Montbui (ES)

( * ) Notice: Subject to any disclaimer, the term of this patent is extended or adjusted under 35 U.S.C. 154(b) by 0 days.

(21) Appl. No.: 09/457,655

(22) Filed: Dec. 9, 1999

(30) Foreign Application Priority Data

Dec. 12, 1998 (ES) ................................................ 9802597

(51) Int. Cl.$^7$ ........................ B32B 25/20; B32B 27/04; B05D 3/02
(52) U.S. Cl. ........................ 428/391; 428/375; 428/392; 428/367; 442/63; 442/87; 442/99; 442/172; 442/178; 442/180; 427/384; 427/387; 427/434.2; 427/434.6
(58) Field of Search .............................. 442/63, 87, 99, 442/172, 178, 180; 428/367, 375, 392, 391; 427/434.2, 434.6, 387, 384

(56) References Cited

U.S. PATENT DOCUMENTS

| | | | | | |
|---|---|---|---|---|---|
| 4,311,626 A | * | 1/1982 | Ona et al. | ................... | 260/29.2 |
| 4,359,545 A | * | 11/1982 | Ona et al. | ................... | 524/262 |
| 4,388,437 A | * | 6/1983 | Ona | ........................ | 524/588 |
| 4,399,247 A | * | 8/1983 | Ona et al. | ................... | 524/204 |
| 4,645,691 A | * | 2/1987 | Ona et al. | ................... | 427/180 |
| 4,935,464 A | * | 6/1990 | Ona et al. | ................... | 524/837 |
| 5,281,658 A | * | 1/1994 | Ona et al. | ................... | 524/838 |
| 5,395,549 A | * | 3/1995 | Ozaki et al. | ................. | 242/174 |
| 6,180,712 B1 | * | 1/2001 | Ishikawa et al. | ............ | 524/588 |

FOREIGN PATENT DOCUMENTS

EP 1024119 * 8/2000

* cited by examiner

Primary Examiner—Cynthia H. Kelly
Assistant Examiner—J. M. Gray
(74) Attorney, Agent, or Firm—Steinberg & Raskin, P.C.

(57) ABSTRACT

Textile elements made of fibres which contain from 40% to 99.9% silicon dioxide and are coated with a silicone-containing emulsion are disclosed. The emulsion includes an anionically stabilized hydroxylated polydiorganosiloxane contains two hydroxyl groups which are linked with silicone by molecule and colloidal silica. The textile elements demonstrate considerable wear resistance. Methods of preparing the same are also disclosed.

12 Claims, No Drawings

TEXTILE ELEMENT MADE OF FIBRES WHICH CONTAIN SILICON AND PROCEDURE FOR IMPROVING THEIR THERMAL STABILITY

This invention relates to a textile element made of fibres, which contain silicon and a procedure for improving their thermal stability.

BACKGROUND OF THE INVENTION

Manufacturers of glass fibre and quartz fibre threads, when spinning same, apply a mixture of organic materials, usually called binding agents, to the surface of the thread in order to lubricate the surface and protect the thread from wear by abrasion during the textile process.

However, the maximum possible improvement in resistance to high temperatures is achieved by removing 99% of the binding agent by applying appropriate heat-cleansing techniques. The temperature and duration of the heating will depend on the shape of the textile element and the available equipment, but as a guideline it may be indicated that the textile element will be subjected to a temperature of 400° C. for at least 60 seconds.

Depending on the nature of the glass fibre thread, the application of a temperature of over 500° C. for periods exceeding 30 seconds can harm the mechanical properties of the textile element.

Textile elements treated with an organic material or with inorganic materials, however, do not improve in thermal stability.

DESCRIPTION OF THE INVENTION

The textile element of the invention made of fibres containing silicon manages to solve the aforesaid disadvantages, while provide other advantages that are described below.

The textile element of the invention made of fibres containing silicon, which is coated with a material, is characterised in that said material is an emulsion of silicone.

Thanks to this characteristic, a textile element of considerable wear resistance is achieved, this resistance being much greater than that of the textile elements treated with an organic material known to date.

Preferably, said fibres include between 40% and 99.9% silicon dioxide.

The silicone emulsion which coats the textile element of the invention is preferably the silicone emulsion marketed under the name of Dow Corning FABRIC COATING 61. This emulsion consists in an anionically stabilised hydroxylated polydiorganosiloxane that contains two hydroxyl groups linked with silicon by molecule and colloidal silica. The emulsion has a pH ranging between 9 and 11.5, while the molecular weight of the polydiorganosiloxane lies between 200,000 and 700,000.

Under a second aspect, the invention relates to a procedure for improving the thermal stability, by increasing considerably the melting point of a textile element made of fibres which contain silicon, which includes the steps of:
- impregnation of said textile element with a silicone emulsion; and
- curing of the impregnated textile element at a predetermined temperature and for a predetermined time.

Preferably, said procedure also includes a phase of cleaning of the impregnated textile element which is carried out prior to impregnation thereof, this cleaning being implemented at a predetermined temperature and for a predetermined period of time.

According to a preferred embodiment, the emulsion has between 10% and 60% of solid material, while the viscosity is within the range of 10,000 to 30,000 cps. Preferably, the curing of the textile element is carried out at a temperature between 350° C. and 90° C. for a period of time between 10 seconds and 10 minutes.

DESCRIPTION OF A PREFERRED EMBODIMENT AND OF THE TESTS CARRIED OUT

For a better understanding of all that has been set out by way of non-restrictive example, a practical case of embodiment is described.

The results obtained on the basis of the tests carried out show that better tensile strength and abrasion resistance are achieved with the textile element of the invention treated with the procedure of the invention than in the case with identical textile elements without silicone emulsion coating and not so treated.

The silicone emulsion that coats the textile element of the invention is the silicone emulsion marketed under the name of Dow Corning FABRIC COATING 61. This emulsion consists in an anionically stabilised hydroxylated polydiorganosiloxane that contains two hydroxyl groups linked with silicon by molecule and colloidal silica. The emulsion has a pH ranging between 9 and 11.5, while the molecular weight of the polydiorganosiloxane lies between 200,000 and 700,000.

These tests were carried out on two textile elements with quartz fibres and glass fibres.

| a) Quartz tube Tube braidwoven on 36-needle head with two quartz threads of 136 tex per needle. | Tensile strength (kg.) | | |
|---|---|---|---|
| | When manufactured | After 16 hours at 1000° C. | |
| Untreated | 57 | 10 | |
| Treated | 125 | 56 | |
| b) Quartz tube Tube braidwoven on 36-neddle head with two quartz threads of 136 tex per needle. | Abrasion resistance (cycles) | | |
| | When manufactured | After 16 hours at 1000° C. | |
| Untreated | 4000 | 56 | |
| Treated | 80000 | 58 | |
| c) Glass tube Tube braidwoven on 18-needle head with glass thread of 68 × 3 tex per needle. | Tensile strength (kg.) | | |
| | When manufactured | After 400 hours at 400° C. | After 90 hours at 600° C. |
| Untreated | 49 | 11 | 4.5 |
| Treated | 49 | 41 | 22 |
| d) Glass tube Tube braidwoven on 18-needle head with glass thread of 68 × 3 tex per needle. | Abrasion resistance (cycles) | | |
| | When manufactured | After 400 hours at 400° C. | After 90 hours at 600° C. |
| Untreated | 350 | 180 | 10 |
| Treated | 25000 | 180 | 35 |

Despite the fact that reference has been made to a specific embodiment of the invention, it will be obvious to an expert in the subject that the textile element described could undergo many variations and modifications, and that the details mentioned could be replaced by others that are technically equivalent, without thereby departing from the sphere of protection defined by the attached claims.

What is claimed is:

1. A textile element made of silicon-containing fibres, said fibres containing between 40 and 99.9% silicon dioxide and said fibres being, coated with a material, characterised in that said material is an emulsion of silicone consisting in an anionically stabilized hydroxylated polydiorganosiloxane that contains two hydroxyl groups linked with silicon by molecule and colloidal silica.

2. Textile element as claimed in claim 1, characterised in that the emulsion has a pH ranging between 9 and 11.5.

3. Textile element as claimed in claim 1, characterised in that the molecular weight of the polydiorganosiloxane lies between 200,000 and 700,000.

4. Textile element as claimed in claim 1, characterised in that the emulsion has between 10% and 60% of solid material, while the viscosity is within the range of 10,000 to 30,000 cps.

5. A procedure for improving the thermal stability of a textile element made of fibres, said fibres containing between 40 and 99.9% silicon dioxide, which includes the steps of:

impregnating said textile element with a silicone emulsion consisting in an anionically stabilized hydroxylated polydiorganosiloxane that contains two hydroxyl groups linked with silicon by molecule and colloidal silica, and curing of the impregnated textile element at a temperature of between 350° C.–900° C. and for a period of time between 10 seconds to 10 minutes.

6. Procedure as claimed in claim 5, further comprising a step of cleaning of the impregnated textile element which is carried out prior to impregnation thereof this cleaning being implemented at a predetermined temperature, and for a predetermined period of time.

7. Procedure as claimed in claim 6, characterised in that the cleaning of the textile element is carried out at a temperature between 350° C. and 900° C. for a period of time between 10 seconds and 10 minutes.

8. Procedure as claimed in claim 5, characterised in that the emulsion has between 10% and 60% of solid material, while the viscosity of the emulsion is from 10,000 to 30,000 cps.

9. Procedure as claimed in claim 5, characterised in that emulsion consists in an anionically stabilised hydroxylated polydiorganosiloxane that contains two hydroxyl groups linked with silicon by molecule and colloidal silica.

10. Procedure as claimed in claim 5, characterised in that the emulsion has a pH ranging between 9 and 11.5.

11. Procedure as claimed in claim 5; characterised in that the molecular weight of the polydiorganosiloxane lies between 200,000 and 700,000.

12. A procedure for improving the thermal stability of a textile element made of fibres, said fibres containing between 40 and 99.9% silicon dioxide, which includes the steps of:

impregnating said textile element with a silicone emulsion; and curing of the impregnated textile element at a temperature of between 150° C.–600° C. and for a period of time between 15 seconds to 15 minutes.

* * * * *

UNITED STATES PATENT AND TRADEMARK OFFICE
CERTIFICATE OF CORRECTION

PATENT NO.      : 6,391,446 B1
DATED           : May 21, 2002
INVENTOR(S)     : Relats Casas It is certified that error appears in the above-identified patent and that said Letters Patent is hereby corrected as shown below:

<u>Title page,</u>
Item [75], add second inventor -- Jordi Relats Manent --

Signed and Sealed this

Twenty-second Day of October, 2002

*Attest:*

JAMES E. ROGAN
*Attesting Officer*                    *Director of the United States Patent and Trademark Office*